April 15, 1958 H. E. WEAVER 2,831,048
SYSTEM FOR ELIMINATING GALLOPING IN AERIAL CONDUCTORS
Filed March 27, 1953 2 Sheets-Sheet 2
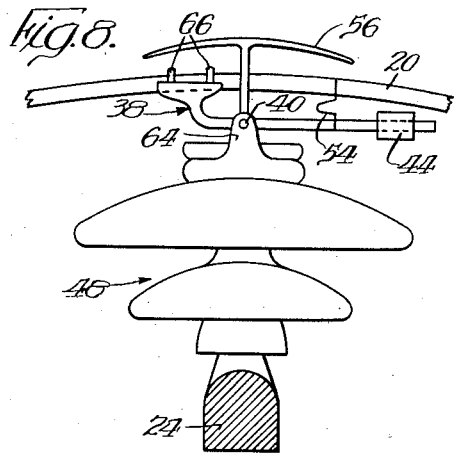
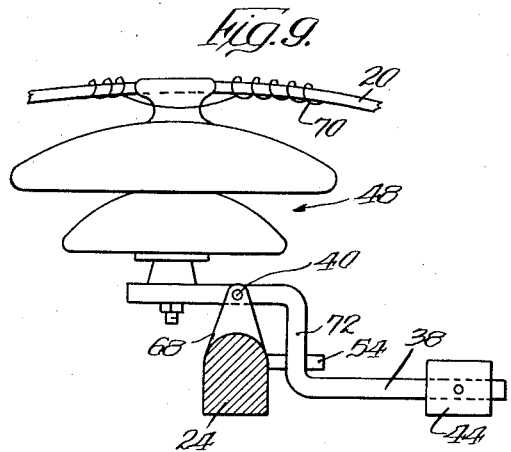
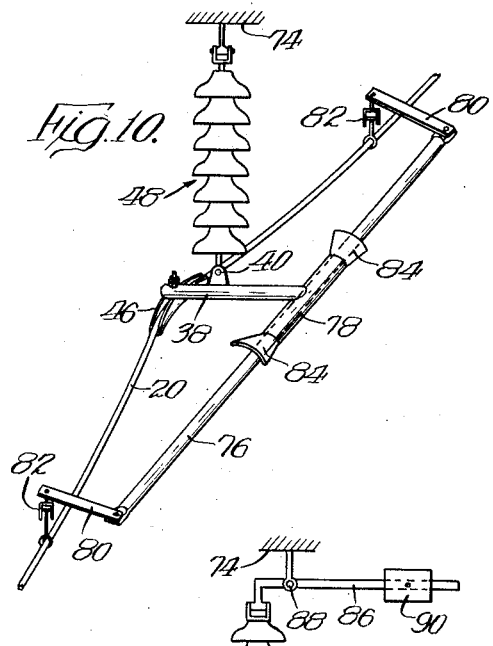
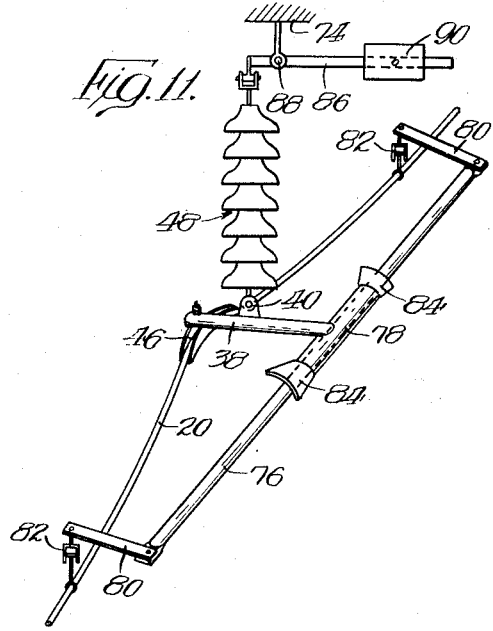
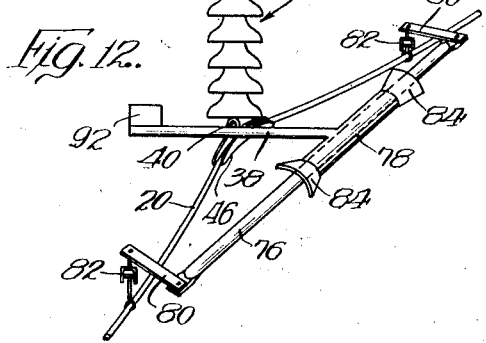
INVENTOR.
Holla E. Weaver
BY
Brown, Jackson, Boettcher & Dienner
Attys.

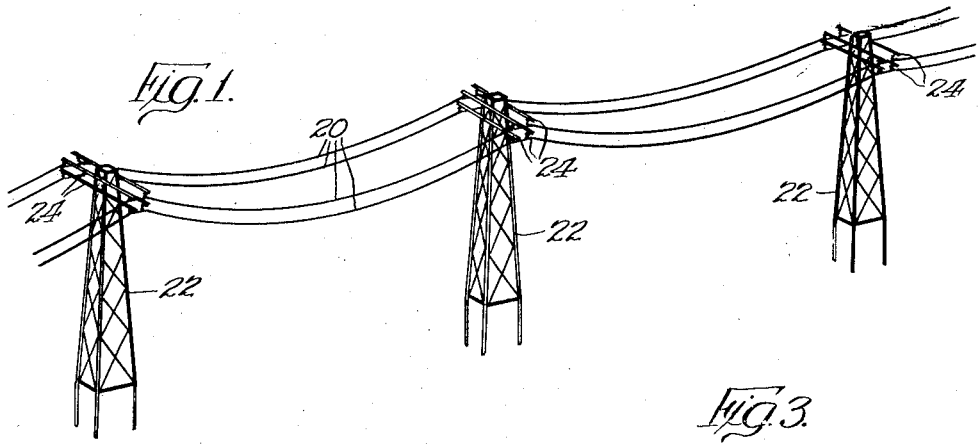
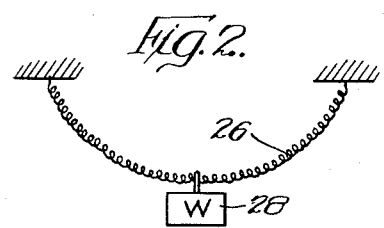
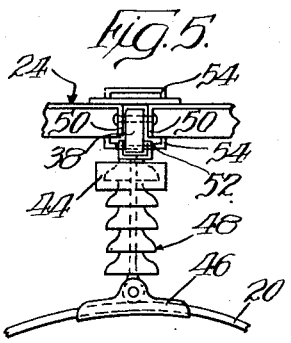
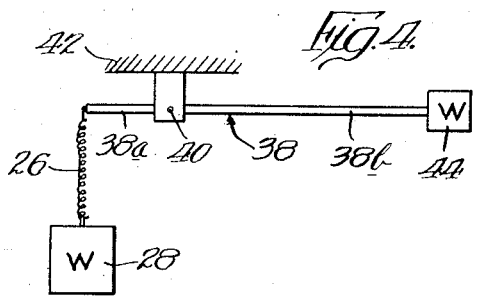
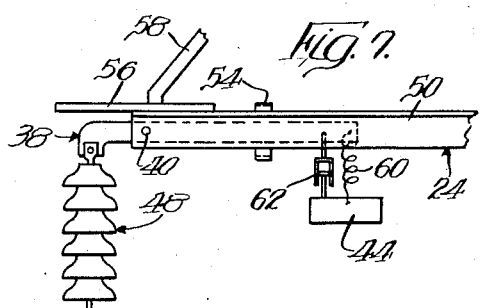
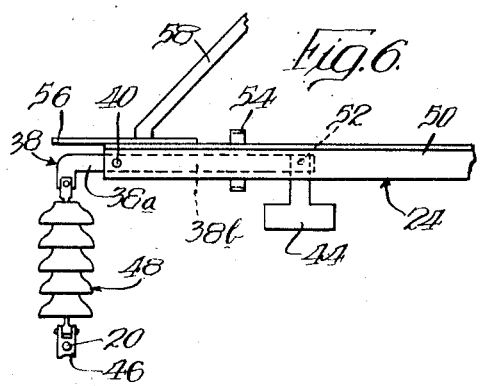

United States Patent Office 2,831,048
Patented Apr. 15, 1958

2,831,048

SYSTEM FOR ELIMINATING GALLOPING IN AERIAL CONDUCTORS

Holla E. Weaver, Maywood, Ill.

Application March 27, 1953, Serial No. 345,150

2 Claims. (Cl. 174—42)

The present invention relates to aerial conductors and particularly to means for eliminating galloping in such conductors.

In aerial conductors, particularly high tension electrical transmission lines, two types of movements have been observed. The first is a vibration of high frequency and small amplitude. This vibration is the well known aeolian vibration and may be mitigated by known means. The second, however, is a movement of slow frequency and great amplitude. On account of its character, this phenomenon is rarely described as a vibration, but is commonly known as "galloping." Galloping is very disadvantageous and tends to self-destruction of the lines, and the insulators and cross bars mounted on towers, poles, or the like, for supporting the lines. Also, due to the amplitude of movement in galloping there is the danger of one line overlapping an adjacent line whereby the lines are short circuited.

The primary object of the present invention is to eliminate galloping in aerial conductors, thus, to overcome the decided disadvantages of this phenomenon.

When wires or lines of circular outline and smooth surface are subject to lateral winds, the only movement that occurs is the aeolian vibration referred to. Galloping occurs only when the wires or lines present areas of unequal wind resistance. This is particularly true when the wires or lines assume a non-circular cross section, such, for example, as when the same are coated with sleet, in which case the wire or line together with the ice adhering thereto assumes a cross sectional configuration approximating a tear drop. In such cases, when lateral winds blow on the line, an angle will be included between the direction of the wind and the forces exerted thereby. Considering now a high tension line, it is seen that the same comprises a wire or strand extending between a pair of supporting towers. The wire or strand has weight and it also has inherent resiliency or "spring." Thus, the line can be resolved to a weight supported by a spring. Now, if a slight upward movement be imparted to the weight (the line), a component of the wind force pushes it even more upward until the spring action or resiliency of the line stops the motion. Since the spring of the line is now stretched, the same imparts a downward movement to the weight of the line, which movement is again assisted by a component of wind force until movement of the line in a downward direction again stretches the spring of the line. Thus, at each limit of movement of the line, the spring or resiliency of the line acts as a rebounding means to keep the line in movement and the wind provides a continuous energy input to sustain line movement. Thus, the movement becomes self-sustaining so that relatively small movements will soon build up into very large ones, even greater than twice the normal sag of the line. The destructive nature of such movement will be apparent.

From the foregoing, it will be appreciated that three components are involved in galloping—wind, weight and spring. Obviously, the wind cannot be eliminated. Likewise, the line cannot be made weightless. This leaves "spring" as the only component with which to work. In accordance with this fact, it is an object of the present invention to eliminate galloping in aerial conductors by substantially reducing or eliminating the spring characteristic of the line.

As will be appreciated, a spring is capable of resilient action only if it has a fixed support. If it has no fixed support, a spring will act much like a solid connector. Thus, if in a high tension line, no fixed means were provided for supporting the line, the spring component thereof would be eliminated. Without spring, galloping could not occur.

It is an object of the present invention to eliminate galloping in aerial conductors by eliminating the spring component of the conductors, specifically, by eliminating fixed supports of the conductors. In particular, it is an object of the present invention to provide movable supports of a non-resilient character for aerial conductors, whereby spring is substantially eliminated from the conductors, thus to eliminate galloping.

In accordance with the present invention, I provide a movable support for aerial conductors comprising means, movably or pivotally supported, for counterbalancing the weight of the conductors. Due to the counterbalancing effect, movement of the conductor will effect movement of the counterbalancing means with the result that the line will not be stretched resiliently. Thus, there will be no spring energy input to the line and the counterbalancing means will dampen out any tendency toward galloping.

Another object of the present invention is to provide movable counterbalancing support means for aerial conductors including means for restraining the movement of the counterbalancing means. The purpose of the restraint is twofold, first, it would limit motion in case of mechanical failure of the equipment, such as the counterbalancing mass falling off, and, second, it would rapidly dissipate the forces due to high momentum, as would occur in case of winds of severe strength, or in the case of part of the ice suddenly falling off the conductor.

A further object of the invention is to provide means for eliminating, first, true galloping and, second, a sort of galloping which consists of longitudinal oscillation of two adjacent spans of aerial conductor. In this latter oscillation, one span rises while the adjacent span falls, so that there is a tendency toward shortening of one span and elongating the other, thus producing a longitudinal swing. In accordance with the present invention, it is an object to eliminate such swing by joining points of each span spaced from the counterbalancing support with one another and the support whereby the alternate movements of the two spans dampen the movement of each other and the counterbalancing means dampens and eliminates the entire galloping effect.

Other objects and advantages of the present invention will become apparent in the following detailed description of preferred embodiments of the invention.

Now, in order to acquaint those skilled in the art with the manner of constructing and using the antigallop or gallop eliminating means of the present invention, I shall describe, in connection with the accompanying drawings, several embodiments of my invention and the manner of constructing and using the same.

In the drawings, wherein like reference numerals refer to like parts:

Figure 1 is a perspective view of several spans of high tension electric transmission line;

Figure 2 is a schematic representation of one span of a line;

Figure 3 is a cross sectional view of a line having a typical sleet or ice coating thereon;

Figure 4 is a schematic representation of a line and the means of the present invention for eliminating galloping in the line;

Figure 5 is a front elevation of one embodiment of the anti-gallop device of the invention;

Figure 6 is a side elevation of the device shown in Figure 5;

Figure 7 is a side elevation of a second embodiment of the device of the present invention;

Figure 8 is a side elevation of a third embodiment of the device of the invention;

Figure 9 is a side elevation of a fourth embodiment of the device of the invention;

Figure 10 is a perspective view of a device formed according to the present invention for eliminating both galloping and longitudinal swing of adjacent spans of a conductor;

Figure 11 is a perspective view of a modification of the device of Figure 10; and Figure 12 is a perspective view of a further modification of the device shown in Figures 10 and 11.

Referring to the drawings, I have shown in Figure 1 a plurality of aerial conductors 20 strung in side by side relation between a plurality of towers or supporting structures 22. Each structure 22 carries cross arms 24 on which insulators (not shown in detail) are mounted for supporting the conductors 20. The portion of each conductor between adjacent supporting structures is referred to as a span and each span has a certain sag. The sag of a conductor is determined by its mass and the tension exerted thereon, or in other words, the amount the line is pulled or stretched. For example, in high tension electrical transmission lines, each span may be approximately 250 feet in length and have a sag of approximately 7 feet. As will be appreciated, each span has weight and it has resiliency. Thus, between each supporting structure 22, a line or conductor 22 may be resolved to a spring 26, having a fix support at each end, and a weight 28 carried by the spring, as is shown in Figure 2.

In Figure 3, I have shown a typical cross sectional configuration acquired by a conductor 20 when the same is coated with ice or sleet, the ice or sleet being indicated at 30. If the wire or conductor is circular in cross section, assuming the absence of the ice 30, and a lateral wind blows against the line, as is indicated by the arrow 32, the wind will exert a force on the opposite side of the line having the same direction as the wind, as is indicated by the dotted arrow 34. This is evident from the symmetry. However, if the wire is non-circular, as the same is in the presence of the ice 30, wherein the cross sectional configuration is in the form of a tear drop, an angle will be included between the direction of the wind and that of the force, the force being exerted in the direction indicated by the arrow 36. This resultant force will have components in both vertical directions. Thus, if the wire acquires a slight initial upward movement, the wind action pushes even more upward until the elastic or spring action, spring 26, of the wire stops the motion. Then, this elastic or spring force moves the wire downward, in which process the wind again helps, so that small vibrations soon build up into very large ones. Stating it in another manner, with reference tto Figure 2, the wind may lift the weight 28 of the cable, then allow it to drop, thus stretching the spring 26 of the wire. Stretching of the spring 26 causes a rebounding of the weight 28 and the wind again lifts the weight of the wire, whereupon the described action is repeated. Probably the wind does not really lift the cable, but only causes it to weigh less whereby the spring action causes the line to rise. As the line falls, it stretches its spring somewhat more than usual so that there is a rebound. Then, if energy is being added by the wind during each lift, a little extra movement may be gained each time and the line will finally oscillate with a large amplitude. This oscillation, which is of low frequency and great amplitude, is galloping, the disadvantages of which have been pointed out. Once started, the disturbance is very persistent and continues for long periods of time with great violence.

From the foregoing, it will be appreciated that one way of preventing galloping is by taking the spring from the system. Obviously, the spring can only act as a spring if it is anchored. Usually, it is anchored to the tower or pole directly or through an insulator or insulator string. The towers 22 are springs themselves. Thus, it will be appreciated that some means must be provided for nullifying both the springiness of the tower and the springiness of the aerial conductor.

In the case of self-excited vibrations, such as galloping, the alternating force that amplifies and sustains the oscillation is created or controlled by the oscillation itself. In such case, the alternating force is automatically resonant with the natural frequency of the oscillation. Calculations show that the frequency of galloping in conductors is of the same order as the natural frequency of the span. The displacement or amplitude for harmonic motion is expressed by the equation:

$$X_o = \frac{P_o}{\sqrt{(CW)^2 + (K - MW^2)^2}} = \frac{\frac{P_o}{K}}{\sqrt{\left(1 - \frac{W^2}{Wn^2}\right)^2 + \left(2 - \frac{W}{Wn}\right)^2}}$$

where:

$X_o$ is the maximum displacement or amplitude;
$P_o$ is the maximum value of force producing the motion;
$C$ is the dampening constant;
$C_c$ is the critical dampening constant;
$W$ is the angular frequency;
$W_n$ is the natural angular frequency;
$K$ is the spring constant; and
$M$ is the mass.

At resonance, where $W$ is approximately equal to $W_n$, this equation reduces to:

$$X_o = \frac{P_o}{K\sqrt{\left(2\frac{C}{C_c}\right)^2}} = \frac{P_o}{2K\frac{C}{C_c}}$$

In the equation, $P_o$ is the force, from the wind, that tends to move the conductor in a vertical direction, but this force can be effective in building up a large motion (gallop) only if the spring constant $K$ is small. When the spring constant $K$ is large, the amplitude $X_o$ is small.

By definition, the spring constant $$K = \frac{\text{Spring force}}{\text{Stretch}}$$

Thus, it will be seen that if the stretch can be eliminated or substantially reduced, the spring constant $K$ will be very large. From the equation, it will be apparent that with a large spring constant $K$, the amplitude $X_o$ cannot be large.

It is at this point that the present invention comes to particular bear on the principle that if the spring has no fixed support it cannot stretch. Specifically, the present invention substantially reduces or eliminates the spring in aerial conductors, and thus eliminates galloping, by providing a movable support for aerial conductors.

Turning now to Figure 4, I have shown a schematic representation of the device of my invention the device, as shown, comprising a simple means for counterbalancing the weight 28 of the aerial conductor and for movably supporting one end of the spring 26 of the conductor. The counterbalancing means comprises a lever arm 38 which is pivotally mounted intermediate its ends, as at 40, to a fixed support 42, which in effect is one of the towers 22. The spring 26 is connected to one end of the arm 38 and the arm, at the opposite end thereof, carries a counterbalancing weight 44. As will be appreciated, the arm 38 to either side of its pivot 40 comprises a fulcrum arm, namely, a conductor fulcrum arm 38a and a counterbalancing arm 38b. To counterbalance the mass or weight 28 of the aerial conductor, the two fulcrum arms and the weight 44 are selected to provide equal foot pound forces to opposite sides of the pivot 40. In other words, the weight of the counterbalance 44 times its fulcrum arm 38b should be equal to the weight 28 of the conductor times its fulcrum arm 38a. By thus counterbalancing the weight of the aerial conductor, it will be appreciated that any upward movement of the weight of the conductor will result in movement of the counterbalancing weight 44 and the lever arm 38 so that there is in effect no anchoring of the spring 26 and thus no or very little stretching of the spring 26. Under these conditions, the spring cannot provide a rebounding effect. Consequently, there can be no build-up of oscillation, resonance cannot be attained, and galloping will not occur. Considering the spring constant K, it will be appreciated that the same will be large because there will be little or no stretching of the spring. Thus, in the amplitude equation, the large value of K will prohibit large amplitude of oscillation. Accordingly, it is clear that galloping will be eliminated.

That the device of Figure 4 is capable of eliminating galloping has been proven by laboratory testing as follows:

Using a line weight 28 of about 50 pounds, which is approximately equivalent to one span of high tension aerial conductor, a spring 26 of 10 pounds per inch, a 1:3 lever arm, and a counterbalancing weight 44 of approximately 16½ pounds, it was found that with the lever 38 rigidly clamped, the weight 28 would readily gallop at a frequency of approximately 100 oscillations per minute. With an amplitude of oscillation of one inch, and in the absence of outside excitation, such as would occur with wind, the weight would gallop for four minutes if the beam or lever were clamped. However, if the weight were made to gallop with one inch amplitude and the beam or lever 38 were then released, the gallop would die down in fifteen seconds. With the same weight and a spring of about two pounds per inch, the frequency of oscillation was 60 per minute. With the beam or lever 38 clamped, an amplitude of one inch could readily be built up, but with such amplitude of oscillation, the gallop would die down in a cycle or two as soon as the beam was released.

In a second laboratory set up, a conventional galloping model was used. This model consists of a light wood D section foil suspended in a frame by light vertical springs above and below each end of the foil. When the model is placed before an electric fan, the D section foil readily gallops. However, with the counterbalancing means of Figure 4 associated with the springs, the foil would not gallop.

In addition to the laboratory tests, the present invention has been tested on an aerial conductor especially designed to produce galloping. This test line is made up of four 250 foot spans of 3/0 stranded copper with a sag of 7 feet to each span. The conductors of the test line are covered with D-shaped wood foils, similar to those employed in the galloping model, so that the line can gallop without the necessity for icing as shown in Figure 3. The D-shaped wood foils serve the purpose of duplicating the conditions provided by the ice coated conductor shown in Figure 3. In this way, galloping will occur many times more frequently than it would naturally. Use of the counterbalancing means of the present invention on the test line has prevented galloping several times when, without it, there would have been galloping.

In use, it will be appreciated that the counterbalancing means of the present invention will nullify the springiness of a part of two adjacent spans of aerial conductor. Thus, a single counterbalancing means has an anti-galloping effect on the adjacent spans that it supports. Accordingly, it is not necessary that a counterbalancing means be provided at each cross arm or support in an aerial conductor system, but may be applied to alternate cross arms effectively to eliminate galloping in all of the spans of the system. However, it will be appreciated that under many conditions it may be desirable to provide a counterbalancing means at each cross arm or support in the system.

The counterbalancing or anti-gallop means of the present invention not only nullifies the springiness of two adjacent spans, but also serves the purpose of segregating the spring influence of the towers or other fixed supports from the lines so that all spring is eliminated, or at least substantially reduced, thereby preventing galloping.

Referring now to Figures 5 and 6, I have shown one practical physical embodiment of the means of the present invention for eliminating galloping. As shown, the aerial conductor 20 is supported in a channel shaped supporting member 46, which member is pivotally connected to the lower end of a conventional insulator string 48. At the opposite end thereof, the insulator 48 is connected to one end of a lever 38 which is pivotally connected intermediate its ends, as at 40, to a cross arm 24, of a supporting tower, such as the towers 22 of Figure 1. As shown, the cross arm 24 comprises a pair of spaced parallel angle irons 50 between which the lever 38 is pivotally mounted. A counterbalancing weight 44 is pivotally connected to the free or inner end of the lever 38, as at 52. The length of the fulcrum arm 38a and 38b of the lever 38 and the mass of the counterbalancing weight 44 are calculated as pointed out hereinbefore and the apparatus is effective to eliminate galloping of the conductor 20 in the manner described.

In addition to the basic arrangement shown in Figure 4, the present invention preferably includes means for restraining movement of the counterbalancing means. To this end, the embodiment of the invention shown in Figures 5 and 6 includes a restraining means or restraint 54 in the form of a box section member presenting abutments above and below the fulcrum arm 38b of the lever 38 so as to limit movement of the counterbalancing means to a predetermined stroke. In use, the restraint 54 serves two valuable purposes, first, to limit motion in case of mechanical failure of the apparatus and, second, to dissipate forces due to high momentum. For example, should the weight 44 fall or be knocked off the lever 38, the restraint will prevent undue sagging of the line. Further, in case some of the ice falls off the line, or in case of winds of very severe strength, the line might commence galloping with considerable momentum. The force due to this momentum can be dissipated more readily by the restraint 54 than by the free floating of the conductor normally provided by the means of the present invention. In addition, the restraint changes the characteristics of the resonant system and de-tunes it, making it necessary to feed more energy to sustain the motion. In effect, then, the restraint 54 introduces negative force and hence, negative energy.

To insure operation of the device of the invention under sleeting conditions, it is preferable to provide a sleet shield 56 for the pivot 40 of the counterbalancing means, the sleet shield 56 being supported by an arm 58 fixed to the supporting structure or tower upon which the cross arm 24 is mounted.

A second embodiment of the anti-galloping means of the present invention is shown in Figure 7, wherein the apparatus is identical to that shown in Figures 5 and 6, with the exception that the counterbalancing mass 44 is supported on the lever 38 by means of a spring 60 and a damper 62. By this arrangement, any wind effect on the counterbalancing mass 44 is not transmitted to the counterbalancing system as a whole, but is eliminated by the spring and damper.

As will be appreciated, the embodiments of the invention shown in Figures 5 and 6, and 7, are adapted to support an aerial conductor beneath the cross arm 24. Frequently, it is desirable to support the aerial conductor 20 in such manner that the same extends over the top of the cross arm or over the top of a like supporting member. An embodiment of the present invention adapted for such support of the aerial conductor is shown in Figure 8, wherein an insulator stack or string 48 is mounted upon the top of a cross arm 24 and extends vertically upward therefrom. At its upper end, the insulator stack 48 carries a bracket 64 providing a bifurcated portion between the bifurcations of which a lever arm 38 is pivotally mounted, as at 40. At one end thereof, the lever arm 38 is provided with a clamp 66 by means of which an aerial conductor 20 may be secured to the lever 38. At the opposite end thereof, the lever arm 38 carries a weight 44 which may be mounted for adjustment longitudinally of the lever 38 so as to counterbalance the weight of the aerial conductor 20. As in the embodiments of the invention previously described, movement of the lever arm 38 is preferably restrained. To this end, a restraint, in the form of a flexible connector 54, is provided between the lever 38 and the conductor 20 to the side of the pivot 40 opposite the connection of the conductor 20 and the lever arm 38 at the clamp 66. To protect the pivot 40 from sleeting conditions and the like, a sleet shield 56, in the form of an umbrella extending upwardly from the top of the insulator stack, is provided. The operation of the device of Figure 8 to prevent galloping of the conductor will be apparent from the previous description of the operation of the device as shown schematically in Figure 4.

A further embodiment of the present invention for supporting an aerial conductor to the upper side of the cross arm is shown in Figure 9, wherein a cross arm 24 is provided with a bracket 68 adapted to support a lever 38 for pivotal movement, the lever being pivoted to the bracket 68 as at 40. At one end thereof, the lever 38 carries an insulator stack or string 48 which extends vertically upwardly therefrom. At its upper end, the insulator stack 48 is adapted for the reception of an aerial conductor 20 which may be connected to the stack by means of a spring connector 70, which is shown somewhat schematically.

At the opposite end thereof, the lever 38 carries a counterbalancing weight 44 which may be movably mounted on the lever arm for adjustment to effect counterbalancing of the mass of the conductor 20 and the insulator stack 48. Adjacent the cross arm 24, the lever arm 38 is preferably provided with a portion generally paralleling the cross arm 24, as indicated at 72, at which portion a restraint 54, connected to the cross arm 24, is provided to limit movement of the lever 38.

In the embodiments of Figures 5 to 7, the movement of the lever 38 is at right angles to the conductor 20, and in Figures 8 and 9, the movement of the lever is parallel to the conductor. As will be appreciated, either relationship of the lever may be provided as desired.

From the foregoing, it will be appreciated that the present invention, as applied in Figures 5 to 9, really nullifies the springiness of a part of two spans and segregates any springiness of the supporting structure. Thus the device works on the resultant or equivalent spring of two adjacent spans of aerial conductor. The effect of the device is to eliminate vertical movement or galloping of the two adjacent spans. However, in addition to this vertical movement, there is another movement, very similar to galloping, which ordinarily occurs on lines having long suspension insulators. In this latter type of movement, the effect is of one line or span moving upwardly while the adjacent span moves downwardly. Thus, the wire in one span is shortened while the wire in the adjacent span is elongated, the effective transfer of wire or line from one span to the next being accommodated by a swing of the suspension insulator string. Thus, this movement is in the nature of galloping, but actually comprises a longitudinal oscillation or swing. Due to the upward movement of one span and the downward movement of the other, the resultant force at the top end of the spring, that is at the insulator, may in fact change very little.

In accordance with the present invention, it is an object to eliminate longitudinal oscillation or swing in aerial conductors. Generally stated, such oscillation is eliminated according to the present invention by providing means for connecting adjacent spans of aerial conductor at points spaced from the support thereof so that the downward movement of one span counteracts the upward movement of the other span and thus dampens and eliminates such movement. Then, by utilizing the mass of the means for connecting spaced points of the adjacent spans as a counterbalance, the basic arrangement of the present invention, as shown in Figure 4, is provided to eliminate all galloping of the conductor, whether that be longitudinal or vertical.

Referring now to Figure 10, I have shown one embodiment of the means provided according to the present invention for eliminating longitudinal oscillation and galloping in aerial conductors. As shown, a suspension insulator 48 is pivotally mounted on and depends from a fixed support 74, which may suitably comprise a cross arm, such as those indicated at 24 in Figure 1. At its lower end, the suspension insulator string 48 provides a pivotal support, as at 40, for a lever 38 at a point intermediate the ends of the lever. At one end thereof, the lever 38 carries a channel shaped supporting member 46 within which an aerial conductor 20 is supported. As pointed out hereinbefore, longitudinal oscillation of the adjacent spans of the conductor 20 is eliminated according to the present invention by connecting points of each span spaced from the support together. To this end, a spanning bar 76 is provided. The bar, which may preferably be in the form of a tube, is journaled intermediate its ends in a tubular member or bearing 78 carried at the opposite or free end of the lever 38. At each end thereof, the spanning bar or tube 76 carries an arm 80, each of which is connected to a point on the conductor 20 spaced from the support 46 thereof. Preferably, the arms 80 are connected to the conductor 20 by means of mechanical dampers 82. In use, the tube 76 connects the spans so as to correlate the movements of the conductor. In addition, the spanning tube 76 and the bearing 78 provide a counterbalance mass, similar to the weight 44 described hereinbefore, so that the mass of the conductor 20 is counterbalanced.

In use of the device of Figure 10, it will be appreciated that if one span of wire tends to rise, it must rotate one end of the spanning shaft or tube 76 and, of course, the other end of the shaft must also rotate and thus force the conductor on the other side of the insulator string to rise also. Accordingly, it will be appreciated that one span cannot rise while the other descends, but both must move together and, thus, there can be no transfer of wire from one span to another and hence no swing of the insulator string 48. The whole device is balanced at the pivot 40 so that in effect the device is the same as that shown in Figure 4. Furthermore, the yoke formed by the shaft or tube 76 and the arms 80 not only coordinates conductor movement in adjacent spans, but provides restraint by attachment to the conductor itself, in a manner somewhat similar to the restraint shown in Figure 8. This device has proven very successful in eliminating both types of galloping in use on the galloping test line described hereinbefore. To protect the device from sleeting conditions, it is preferable to provide sleet shields 84 at each end of the bearing 78.

Turning now to Figure 11, I have shown a modification of the device of Figure 10 for use in cases wherein the ultimate in mitigation is required. As shown, the device is the same as that shown in Figure 10, with the exception that the suspension insulator 48 is supported at one end of a lever 86, which lever is pivotally mounted intermediate its ends to the fixed support 74, as at 88. The mass of the suspension insulator 48 and the apparatus disposed at the lower end thereof are counterbalanced by means of a weight 90 which is adjustably mounted on the lever 86 to the side of the pivot 88 opposite the insulator 48.

A further modification of the device of Figure 10 is shown in Figure 12, wherein a high order of mitigation is obtained by utilizing the device of Figure 11 as modified to the extent that the aerial conductor 20 is supported directly beneath the insulator string 48 and the lever 38 is provided with arms extending to either side of the conductor, the lever arm 38 to one side of the conductor carrying the anti-gallop means comprising the shaft 76 and associated apparatus and to the other side of the conductor carrying a weight 92 for counterbalancing the mass of the bearing 78 and the shaft 76.

From the foregoing, it will be appreciated that the present invention provides means of an economical yet highly practical nature for eliminating galloping in aerial conductors. The present invention provides means for eliminating both conventional galloping and the longitudinal oscillation that approximates galloping. According to the present invention, galloping is eliminated by substantially eliminating anchors for the aerial conductor so that the spring factor of the conductor is eliminated. By substantially eliminating an anchor for the line or conductor the line is rendered incapable of resilient stretching so that the spring constant K of the conductor is very large. By the provision of a large value for K, displacement of the conductor must be slight in view of the amplitude equation set forth hereinbefore. While the conductor may move to some extent, such movement is not a component of resonant motion and it is not effective in causing build-up of oscillation into galloping. From the foregoing then, it will be appreciated that the device of the present invention comprises an effective anti-gallop device for eliminating all objectionable oscillations that may occur in aerial conductors.

While I have described what I regard to be preferred embodiments of my invention, It will be appreciated by those skilled in the art that variations, changes and modifications may be made therein without departing from the scope of the invention, as defined by the appended claims.

I claim:
1. For use with an aerial conductor adapted to be supported on the cross arms of spaced towers and like fixed supports, an anti-gallop device comprising a lever pivotally mounted intermediate its ends on a cross arm of a support, an insulator connected to one end of the lever, said insulator providing a support for the conductor, a weight supported adjacent the other end of said lever for counterbalancing the mass of said insulator and the conductor supported by said insulator, and a restraining member connected to the cross arm and presenting spaced abutments in the path of pivotal movement of said lever on either side of the normal balanced position of said lever.

2. For use with an aerial conductor adapted to be supported on the cross arms of spaced towers and like fixed supports, an anti-gallop device comprising a lever pivotally mounted intermediate its ends on a cross arm of a support, an insulator connected to one end of the lever, said insulator providing a support for the conductor, a weight supported adjacent the other end of said lever for counterbalancing the mass of said insulator and the conductor supported by said insulator, and a restraining member connected to the cross arm and presenting spaced abutments in the path of pivotal movement of said lever on either side of the normal balanced position of said lever, said weight being connected to said lever by means of a spring and a mechanical damper.

References Cited in the file of this patent

UNITED STATES PATENTS

| | | |
|---|---|---|
| 1,917,600 | Rhodes | July 11, 1933 |
| 2,058,174 | Monroe | Oct. 20, 1936 |
| 2,065,336 | Langton | Dec. 22, 1936 |
| 2,335,834 | Wood | Nov. 30, 1943 |
| 2,453,361 | Clement | Nov. 9, 1948 |

FOREIGN PATENTS

| | | |
|---|---|---|
| 444,694 | Great Britain | Mar. 25, 1936 |
| 543,578 | Germany | Feb. 6, 1932 |

OTHER REFERENCES

Webster's International Dictionary of the English Language, Unabridged, 1937.